(12) United States Patent
Koskinen et al.

(10) Patent No.: US 9,832,654 B2
(45) Date of Patent: Nov. 28, 2017

(54) NETWORK SHARING FOR LTE-U/LAA CELLS OPERATING ON UNLICENSED SPECTRUM

(71) Applicant: NOKIA CORPORATION, Espoo (FI)

(72) Inventors: Jussi-Pekka Koskinen, Oulu (FI); Ilkka Keskitalo, Oulu (FI); Jarkko Koskela, Oulu (FI); Jorma Kaikkonen, Oulu (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 56 days.

(21) Appl. No.: 14/523,440

(22) Filed: Oct. 24, 2014

(65) Prior Publication Data

US 2016/0119791 A1   Apr. 28, 2016

(51) Int. Cl.
| | |
|---|---|
| H04W 16/12 | (2009.01) |
| H04W 16/14 | (2009.01) |
| H04W 24/10 | (2009.01) |
| H04W 48/08 | (2009.01) |
| H04W 84/04 | (2009.01) |

(52) U.S. Cl.
CPC ........... *H04W 16/14* (2013.01); *H04W 24/10* (2013.01); *H04W 48/08* (2013.01); *H04W 84/042* (2013.01)

(58) Field of Classification Search
CPC ................................ H04W 16/14; G08B 3/10
USPC ......... 455/454, 404.1, 404.2, 550.1; 370/329
See application file for complete search history.

(56) References Cited

U.S. PATENT DOCUMENTS

| | | | | |
|---|---|---|---|---|
| 8,331,228 B2 * | 12/2012 | Huber | ................ | G06Q 20/1235 370/229 |
| 2014/0023016 A1 * | 1/2014 | Mildh | ..................... | H04L 5/001 370/329 |
| 2014/0226609 A1 * | 8/2014 | Hooli | .................... | H04W 16/14 370/329 |
| 2015/0018002 A1 * | 1/2015 | Touag | .................. | H04W 16/14 455/454 |

OTHER PUBLICATIONS

"3rd Generation Partnership Project; Technical Specification Group Radio Access Network; Evolved Universal Terrestrial Radio Access (E-UTRA) Radio Resource Control (RRC); Protocol specification (Release 8)" 3GPP TS 36.331 V8.0.0 (Dec. 2007).

* cited by examiner

*Primary Examiner* — Vladimir Magloire
*Assistant Examiner* — Majid Syed
(74) *Attorney, Agent, or Firm* — Squire Patton Boggs (US) LLP

(57) ABSTRACT

Various communication devices may benefit from network sharing. For example, network sharing may be beneficial for long term evolution on unlicensed band (LTE-U) and/or licensed-assisted access (LAA) cells operating on an unlicensed spectrum according to the third generation partnership project. Further, LTE enhancements may be implemented for LAA to unlicensed spectrum, including LTE-U. A method may include preparing information related to a carrier and/or cell operating on a non-licensed spectrum. The method may also include providing, from a network element operating on a licensed spectrum to a user equipment, the information related to the carrier and/or cell operating on the non-licensed spectrum.

19 Claims, 3 Drawing Sheets

*PLMN-Identity* information element

```
-- ASN1START

PLMN-Identity ::=        SEQUENCE {
    mcc                      MCC           OPTIONAL,       -- Cond MCC
    mnc                      MNC
}

MCC ::=                  SEQUENCE (SIZE (3)) OF
                             MCC-MNC-Digit MNC ::=                  SEQUENCE (SIZE (2..3)) OF
                             MCC-MNC-Digit MCC-MNC-Digit ::=        INTEGER (0..9)

-- ASN1STOP
```

***PLMN-Identity* information element**

```
-- ASN1START

PLMN-Identity ::=       SEQUENCE {
    mcc                     MCC                                 OPTIONAL,    -- Cond MCC
    mnc                     MNC
}

MCC ::=                 SEQUENCE (SIZE (3)) OF
                            MCC-MNC-Digit MNC ::=                 SEQUENCE (SIZE (2..3)) OF
                            MCC-MNC-Digit MCC-MNC-Digit ::=       INTEGER (0..9)

-- ASN1STOP
```

Figure 1

NETWORK SHARING FOR LTE-U/LAA CELLS OPERATING ON UNLICENSED SPECTRUM

BACKGROUND

Field

Various communication devices may benefit from network sharing. For example, network sharing may be beneficial for long term evolution on unlicensed band (LTE-U) and/or licensed-assisted access (LAA) cells operating on an unlicensed spectrum according to the third generation partnership project (3GPP). Further, LTE enhancements may be implemented for LAA to unlicensed spectrum, including LTE-U.

Description of the Related Art

The fast update of LTE in different regions of the world shows both that demand for wireless broad data is increasing, and that LTE is an extremely successful platform to meet that demand. At the same time, unlicensed spectrum is being considered by more cellular operators as a complementary tool to augment their service offering.

Unlicensed spectrum may not be able to match the qualities of the licensed regime. However, those solutions that allow an efficient use of unlicensed spectrum as a complement to licensed deployments have the potential to bring great value to 3GPP operators, and ultimately, to the 3GPP industry as a whole. Given the widespread deployment and usage of other technologies in unlicensed spectrum for wireless communications in society, it is envisioned that LTE would have to coexist with existing and future uses of unlicensed spectrum. Existing and new spectrum licensed for exclusive use by international mobile telecommunications (IMT) technologies will remain fundamental for providing seamless coverage, achieving the highest spectral efficiency, and ensuring the highest reliability of cellular networks through careful planning and deployment of high-quality network equipment and devices.

LAA should not impact/interfere with other systems, such as, for example, Wi-Fi, more than an additional Wi-Fi network on the same carrier. According to regulatory requirements, only certain amount of data can be transmitted without a listen before talk (LBT) mechanism, which may not be feasible for cell discovery and cell specific broadcast signaling. This may cause a problem that broadcast signaling space in unlicensed spectrum is limited. Further, it is assumed, for example, that primary synchronization channel (PSS)/secondary synchronization channel (SSS)/common reference signal (CRS) and system information are transmitted without LBT.

LTE-U/LAA is assumed to support network/radio access network (RAN) sharing which may be problematic because a public land mobile network (PLMN) identification (ID) may be quite long in size and all the necessary PLMN, such as, for example, a maximum of six (own PLMN+5 others), needs to be signaled.

As shown in FIG. 1, PLMN identity is coded, in approximately 12 bytes total, in 3GPP TS 36.331, section 6.3.4. In the worst case scenario for network sharing, the network would need to signal 6 PLMN identities, which equate to 6×12 bytes, totaling 72 bytes.

Complementing the LTE platform with unlicensed spectrum is a possible choice under the above considerations. It would enable operators and vendors to leverage the existing or planned investments in LTE/evolved packet core (EPC) hardware in the radio and core network, especially if "Licensed-Assisted Access" is considered a secondary component carrier integrated into LTE.

SUMMARY

According to certain embodiments, a method may include preparing information related to a carrier and/or cell operating on a non-licensed spectrum. The method may also include providing, from a network element operating on a licensed spectrum to a user equipment, the information related to the carrier and/or cell operating on the non-licensed spectrum.

According to other embodiments, a method may include receiving, at a user equipment, information from a network element operating on a licensed spectrum. The method may also include processing the information. In certain embodiments, the information may be related to a carrier and/or cell operating on a non-licensed spectrum.

An apparatus, according to certain embodiments, may include at least one processor, and at least one memory including computer program code. The at least one memory and the computer program code may be configured to, with the at least one processor, cause the apparatus at least to prepare information related to a carrier and/or cell operating on a non-licensed spectrum. The at least one memory and the computer program code may also be configured to, with the at least one processor, cause the apparatus at least to provide, from a network element operating on a licensed spectrum to a user equipment, the information related to the carrier and/or cell operating on the non-licensed spectrum.

An apparatus, according to other embodiments, may include at least one processor, and at least one memory including computer program code. The at least one memory and the computer program code may be configured to, with the at least one processor, cause the apparatus at least to receive, at a user equipment, information from a network element operating on a licensed spectrum. The at least one memory and the computer program code may also be configured to, with the at least one processor, cause the apparatus at least to process the information. In certain embodiments, the information may be related to a carrier and/or cell operating on a non-licensed spectrum.

According to certain embodiments, a computer program may be embodied on a non-transitory computer readable medium. The computer program, when executed by a processor, may cause the processor at least to prepare information related to a carrier and/or cell operating on a non-licensed spectrum. The computer program, when executed by a processor, may also cause the processor at least to provide, from a network element operating on a licensed spectrum to a user equipment, the information related to the carrier and/or cell operating on the non-licensed spectrum.

According to other embodiments, a computer program may be embodied on a non-transitory computer readable medium. The computer program, when executed by a processor, may cause the processor at least to receive, at a user equipment, information from a network element operating on a licensed spectrum. The computer program, when executed by a processor, may also cause the processor at least to process the information. In certain embodiments, the information may be related to a carrier and/or cell operating on a non-licensed spectrum.

An apparatus, according to certain embodiments, may include means for preparing information related to a carrier and/or cell operating on a non-licensed spectrum. The apparatus may also include means for providing, from a network element operating on a licensed spectrum to a user equipment, the information related to the carrier and/or cell operating on the non-licensed spectrum.

An apparatus according to other embodiments, may include means for receiving, at a user equipment, information from a network element operating on a licensed spectrum. The apparatus may also include means for processing the information. In certain embodiments, the information may be related to a carrier and/or cell operating on a non-licensed spectrum.

A computer program product may, in certain embodiments, encode instructions for performing a process. The process may include preparing information related to a carrier and/or cell operating on a non-licensed spectrum. The process may also include providing, from a network element operating on a licensed spectrum to a user equipment, the information related to the carrier and/or cell operating on the non-licensed spectrum.

A computer program product may, in other embodiments, encode instructions for performing a process. The process may include receiving, at a user equipment, information from a network element operating on a licensed spectrum. The process may also include processing the information. In certain embodiments, the information may be related to a carrier and/or cell operating on a non-licensed spectrum.

BRIEF DESCRIPTION OF THE DRAWINGS

For proper understanding of the invention, reference should be made to the accompanying drawings, wherein:

FIG. 1 illustrates coding of a PLMN-identity information element.

DETAILED DESCRIPTION

Figure 2:
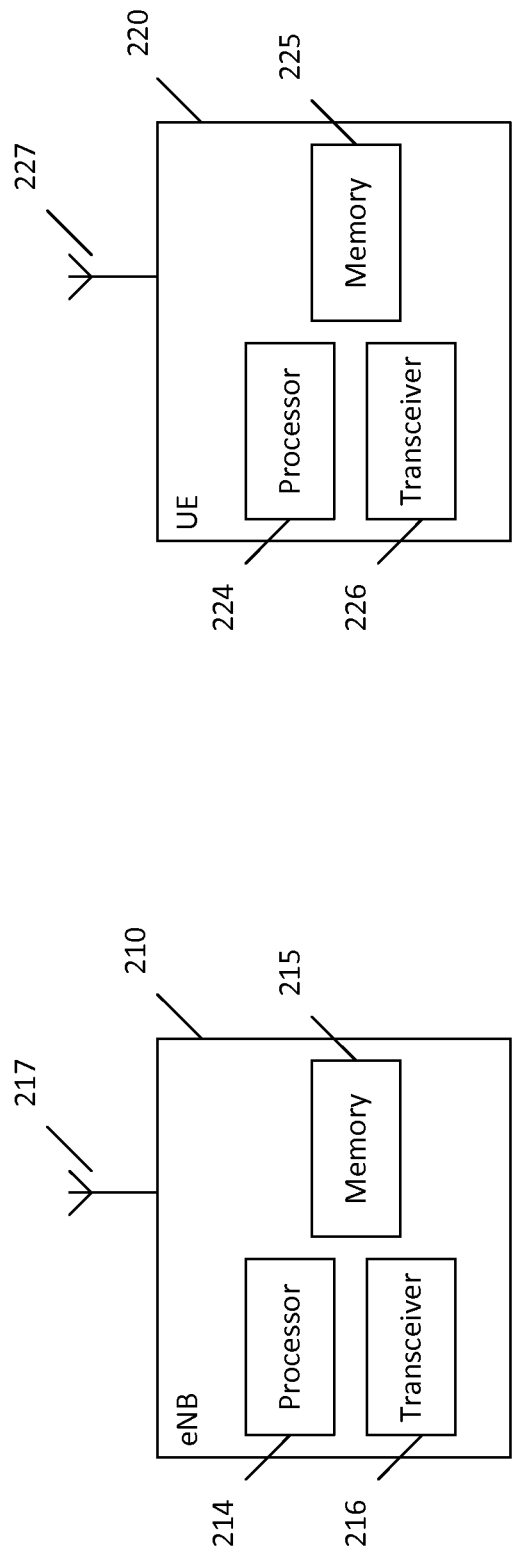
FIG. 2 illustrates a system according to certain embodiments.

According to certain embodiments, information signaling for network sharing may be signaled, in broadcast and/or a dedicated manner, via a cell or system operating on the licensed spectrum. For example, in certain embodiments, a cell or system on the licensed spectrum may provide, via broadcast and/or dedicating signaling, information related to carrier and/or cell(s) on the non-licensed spectrum.

The information may include, for example: (1) information relevant when evaluating if a user equipment (UE) is allowed to access a cell and the scheduling of other system information; (2) radio resource configuration information; (3) cell re-selection and measurement reporting and measurement information common for intra-frequency, inter-frequency and/or inter-radio access technology (RAT) mobility; (4) relevant identity related information, such as, for example, physical cell identity (PCI), cell global identity (CGI), PLMN, frequency, and routing area update (RAU)/tracking area update (TAU)/location area update (LAU); (5) the information required to acquire multimedia broadcast multicast services (MBMS) control information associated with one or more multicast-broadcast single-frequency network (MBSFN) areas; (6) extended access class barring parameters; and (7) information relevant for traffic steering between evolved universal terrestrial radio access network (E-UTRAN), on an unlicensed spectrum, and wireless local area network (WLAN).

As a simple illustration, PLMN is described as an example of the information signaling for network sharing in the various embodiments described below, without limitation.

According to other embodiments, PLMN signaling for network sharing may be signaled, in a broadcast and/or dedicated manner, via a cell operating on the licensed spectrum. For example, a primary cell (Pcell) may signal a list of PLMNs operating on an unlicensed spectrum for network sharing. The UE may assume only cells belonging to the list of PLMNs are present, and may access any cell on the LTE-U band if there is a match between the list of PLMNs according to the UE's access rules.

Further, according to certain embodiments, PLMN signaling network sharing may be signaled, in a broadcast and/or a dedicated manner, via a cell operating on the licensed spectrum. In such a case, the PLMN information may be broadcasted in the cell on the LTE-U band in a time divided manner. For example, if two PLMNs share the same RAN in LTE-U, PLMN1 information may be broadcasted at different time intervals than PLMN2 information.

According to other embodiments, only a fraction of the PLMN information may be broadcasted in the LTE-U band. The fraction of the PLMN identity may refer to one of the PLMNs' broadcast on the licensed band in a system information block (SIB) from where the complete PLMN supported in the LTE-U band can be derived. Additionally, in other embodiments, a combination of any of the above-described signaling and broadcast options may be applied in PLMN signaling for network sharing that is signaled via a cell or system operating on the licensed spectrum.

In certain embodiments, PLMN identities may be signaled, in a broadcast and/or in a dedicated manner, with a corresponding index on a cell operating on a licensed spectrum. In other embodiments, only the index, which maps to the PLMN given, may be signaled on the cell operating on the unlicensed spectrum.

Additionally, according to certain embodiments, on the unlicensed spectrum, only a limited number of PLMNs may be broadcasted at the same transmission occasion. In particular, a number of broadcasted PLMNs may be indicated. For example, if there is an enhanced system information block (eSIB) broadcast on LAA with a periodicity of 40 ms, then every other eSIB could have a partial amount of PLMNs. In certain embodiments the partial amount of PLMNs may be approximately half the number of PLMNs.

Furthermore, according to other embodiments, there may be an indication that not all PLMNs are in one eSIB. This could be, for example, a bit or "index of eSIB" indicating which order number the SIB is.

According to certain embodiments, it may be assumed that LTE-U/LAA will utilize LTE carrier aggregation configurations and architecture where a (lower-power) secondary cell (Scell) operates in the unlicensed spectrum, and is either downlink (DL)-only or contains uplink (UL) and DL, and where the Pcell operates in the licensed spectrum and may be either LTE frequency division duplex (FDD) or LTE time division duplex (TDD). It may also be assumed that the LTE-U/LAA cell will transmit/broadcast system information and/or discovery signals consisting of, for example, PCI, PLMN, CGI, system frame number (SFN) timing, access parameters, LBT parameters etc.

Additionally, there may be several options for enabling network sharing for a cell, such as an Scell, operating on an unlicensed spectrum. As one option, a cell, such as a Pcell on a licensed spectrum may signal, via dedicated and/or broadcast signaling, a list of PLMNs for network sharing in an unlicensed spectrum. However, in order for the UE to understand which cell belongs to which PLMN on LAA, information for which cell the PLMN information is valid can also be included. The cell may also indicate for which PCI(s), such as for example, range of PCIs, indicated PLMN(s) are valid.

As a second option, a cell, such as a Pcell on a licensed spectrum may signal, via dedicated and/or broadcast signaling, a list of PLMNs with an index, or other common identifier, for network sharing. Further, a cell, such as an Scell on an unlicensed spectrum may broadcast only the index instead of the PLMN ID. In this case, the UE would be able to determine the PLMN based on the index provided.

As a third option, a cell, such as an Scell on an unlicensed spectrum may broadcast PLMNs in a changing manner. For example, the broadcasted PLMN may be different in different transmission occasions, including a limited number, such as, for example, one or two, etc., PLMNs may be broadcasted at a time. In addition, a number of broadcasted PLMNs could be indicated. For example, if there is eSIB broadcast on LAA with periodicity of 40 ms, then every other eSIB could have a partial amount of PLMNs, such as, for example, approximately half of the PLMNs. Further, there may be an indication that not all PLMNs are in one eSIB. This may be, for example, a bit or "index of eSIB" indicating which order number the SIB is. Alternatively, the full, or partly, PLMN information may be broadcasted on an LTE-U cell, such as, for example, in eSIB or detection signal, in a TDD manner.

The above-described embodiments may provide distinct advantages. For example, according to certain embodiments, it may be possible to optimize signaling for LTE-U/LAA. Further, according to other embodiments, it may be possible to have RAN/network sharing.

FIG. 2 illustrates a system according to certain embodiments of the invention. In one embodiment, a system may include multiple devices, such as, for example, at least one evolved node B (eNB) 210 or a base station or access point, and at least one UE 220. According to certain embodiments, the UE may include any terminal device, such as, for example, a sensor, a smart meter, a personal digital assistant (PDA), smart phone, laptop computer, tablet computer, computer terminals and/or network devices.

Each of these devices may include at least one processor, respectively indicated as 214 and 224. At least one memory may be provided in each device, and indicated as 215 and 225, respectively. The memory may include computer program instructions or computer code contained therein. The processors 214 and 224, and memories 215 and 225, or a subset thereof, may be configured to provide means corresponding to the various blocks of FIG. 3.

As shown in FIG. 2, transceivers 216 and 226 may be provided, and each device may also include an antenna, respectively illustrated as 217 and 227. Transceivers 216 and 226 may each, independently, be a transmitter, a receiver, or both a transmitter and a receiver, or a unit device that is configured both for transmission and reception.

Processors 214 and 224 may be embodied by any computational or data processing device, such as a central processing unit (CPU), application specific integrated circuit (ASIC), or comparable device. The processor may be implemented as a single controller, or a plurality of controllers or processors.

Memories 215 and 225 may be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language.

Figure 3:
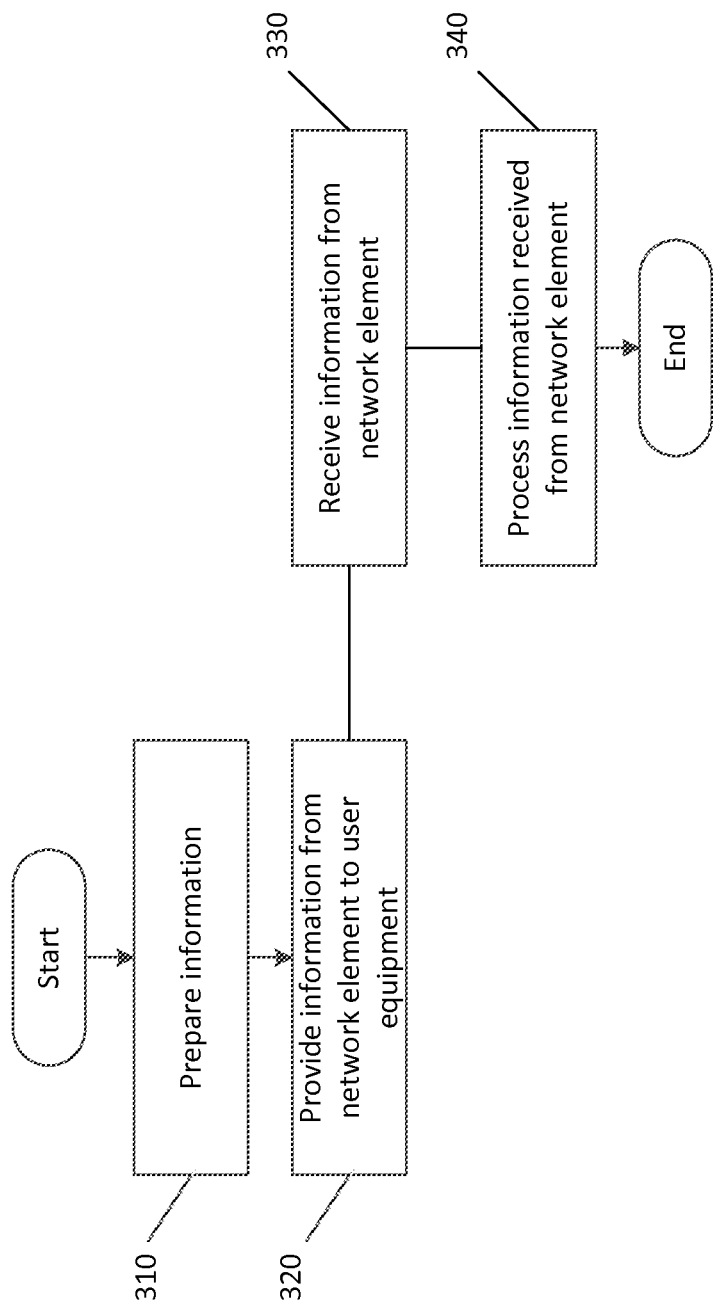
FIG. 3 illustrates a method according to certain embodiments.

The memory and computer program instructions may be configured, with the processor for the particular device, to cause a hardware apparatus such as eNB 210 and UE 220, to perform any of the processes described herein (see, for example, FIG. 3). Therefore, in certain embodiments, a non-transitory computer-readable medium may be encoded with computer instructions that, when executed in hardware, perform a process such as one of the processes described herein. Alternatively, certain embodiments of the invention may be performed entirely in hardware.

Furthermore, although FIG. 2 illustrates a system including an eNB 210 and UE 220, embodiments of the invention may be applicable to other configurations, and configurations involving additional elements. For example, not shown, additional UEs and/or eNBs may be present.

FIG. 3 illustrates a method according to certain embodiments. As shown in FIG. 3, a method may include, at 310, preparing the information. The information may be related to a carrier and/or cell operating on a non-licensed spectrum. The method may also include at 320, providing, from a network element operating on a licensed spectrum to a user equipment, the information related to the carrier and/or cell operating on the non-licensed spectrum. In certain embodiments, the network element may include an eNB, base station or access point.

FIG. 3 also illustrates a method that may include, at 330, receiving, at a user equipment, information from a network element. The network element may be operating on a licensed spectrum. The method may also include at 340, processing the information. In certain embodiments, the information may be related to a carrier and/or cell operating on a non-licensed spectrum.

It will be readily understood that the components of the invention, as generally described and illustrated in the figures herein, may be arranged and designed in a wide variety of different configurations. Thus, the above detailed description of the embodiments of systems, methods, apparatuses, and computer program products for network sharing for LTE-U/LAA cells operating on unlicensed spectrum, as represented in the attached figures, is not intended to limit the scope of the invention, but is merely representative of selected embodiments of the invention.

The features, structures, or characteristics of certain embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed above may be performed in a different order and/or concurrently with each other. Furthermore, if desired, one or more of the described functions may be optional or may be combined. As such, the above description should be considered as merely illustrative of the principles, teachings and embodiments of this invention, and not in limitation thereof.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Glossary

3GPP Third Generation Partnership Project
ASIC Application Specific Integrated Circuit
CGI Cell Global Identity
CPU Central Processing Unit
CRS Common Reference Signal
DL Downlink
eNB Evolved Node B
EPC Evolved Packet Core
eSIB Enhanced Signal Information Block
E-UTRAN Evolved Universal Terrestrial Radio Access Network
FDD Frequency Division Duplex
HDD Hard Disk Drive
ID Identification
IMT International Mobile Telecommunications
LAA Licensed Assisted Access
LAU Location Area Update
LBT Listen Before Talk
LTE Long Term Evolution (a.k.a., E-UTRA)
LTE-U LTE on Unlicensed Band
MBMS Multimedia Broadcast Multicast Services
MBSFN Multicast-Broadcast Single-Frequency Network
Pcell Primary Cell
PDA Personal Digital Assistant
PCI Physical Cell Identity
PLMN Public Land Mobile Network
PSS Primary Synchronization Channel
RAM Random Access Memory
RAN Radio Access Network
RAT Radio Access Technology
RAU Routing Area Update
Scell Secondary Cell
SFN System Frame Number
SIB System Information Block
SSS Secondary Synchronization Channel
TAU Tracking Area Update
TDD Time Division Duplex
UE User Equipment
UL Uplink
WLAN Wireless Local Area Network

We claim:

1. A method, comprising:
preparing information related to a carrier and/or cell operating on a non-licensed spectrum; and
providing, from a network element operating on a licensed spectrum to a user equipment, the information related to the carrier and/or cell operating on the non-licensed spectrum,
wherein the information includes a list of a plurality of public land mobile networks operating on the non-licensed spectrum for network sharing,
wherein the list of public land mobile networks also includes additional information indicating for which carrier and/or cell that each of the public land mobile networks in the list is valid,
wherein the information comprises identity information of each of the plurality of public land mobile networks,
wherein a fraction of the information is broadcast in the carrier and/or cell operating on the non-licensed spectrum,
wherein the fraction of the public land mobile network identity information corresponds to one of the public land mobile network's broadcast on the licensed spectrum in a system information block from where a complete public land mobile network supported in the non-licensed band is derived,
wherein only cells belonging to the list of public land mobile networks are assumed to be present by the user equipment,
wherein any cell on the non-licensed spectrum is accessible by the user equipment if there is a match between the list of public land mobile networks provided from the network element and a list of public land mobile networks according to the user equipment's access rules,
wherein the information is broadcasted in one or more system information blocks at a periodicity of 40 ms, and
wherein every other system information block broadcasted within the periodicity includes a partial amount of the public land mobile networks in the list.

2. The method of claim 1, wherein the information comprises at least one of information of whether the user equipment is allowed access to a cell and scheduling of system information, radio resource configuration information, cell-reselection and measurement reporting and measurement information common for intra-frequency and/or inter-radio access technology mobility, identity related information, information required to acquire multimedia broadcast multicast services, extended access class barring parameters, and information relevant for traffic steering between different radio networks.

3. The method of claim 1, wherein the information is sent from a primary cell operating on the licensed spectrum.

4. The method of claim 1, wherein the information includes a corresponding index on at least one cell operating on the licensed spectrum.

5. The method of claim 1, wherein the information is broadcast in the carrier and/or cell operating on the non-licensed spectrum in a time divided manner.

6. A method, comprising:
receiving, at a user equipment, information from a network element operating on a licensed spectrum; and
processing the information, wherein the information is related to a carrier and/or cell operating on a non-licensed spectrum,
wherein the information includes a list of a plurality of public land mobile networks operating on the non-licensed spectrum for network sharing,
wherein the list of public land mobile networks also includes additional information indicating for which carrier and/or cell that each of the public land mobile networks in the list is valid,
wherein the information comprises identity information of each of the plurality of public land mobile networks, wherein a fraction of the information is received from the carrier and/or cell operating on the non-licensed spectrum, wherein the fraction of the public land mobile network identity information corresponds to one of the public land mobile network's broadcast on the licensed spectrum in a system information block from where a complete public land mobile network supported in the non-licensed band is derived, wherein the user equipment assumes that only cells belonging to the list of public land mobile networks are present, wherein any cell on the non-licensed spectrum is accessible by the user equipment if there is a match between the list of public land mobile networks received by the user equipment and a list of public land mobile networks according to the user equipment's access rules, wherein the information is received via a broadcast in one or more system information blocks at a periodicity of 40 ms, and wherein every other system information block received within the periodicity includes a partial amount of the public land mobile networks in the list.

7. The method of claim 6, wherein the information comprises at least one of information of whether the user equipment is allowed access to a cell and scheduling of system information, radio resource configuration information, cell-reselection and measurement reporting and measurement information common for intra-frequency and/or inter-radio access technology mobility, identity related information, information required to acquire multimedia broadcast multicast services, extended access class barring parameters, and information relevant for traffic steering between different radio networks.

8. The method of claim 6, wherein the information is received from a primary cell operating on the licensed spectrum.

9. The method of claim 6, wherein the information includes identity information of a plurality of public land mobile networks and a corresponding index on at least one cell operating on the licensed spectrum.

10. An apparatus, comprising:
at least one processor; and
at least one memory including computer program code,
wherein the at least one memory and the computer program code are configured to, with the at least one processor, cause the apparatus at least to
prepare information related to a carrier and/or cell operating on a non-licensed spectrum; and
provide, from a network element operating on a licensed spectrum to a user equipment, the information related to the carrier and/or cell operating on the non-licensed spectrum,
wherein the information includes a list of a plurality of public land mobile networks operating on the non-licensed spectrum for network sharing,
wherein the list of public land mobile networks also includes additional information indicating for which carrier and/or cell that each of the public land mobile networks in the list is valid,
wherein the information comprises identity information of each of the plurality of public land mobile networks,
wherein a fraction of the information is broadcast in the carrier and/or cell operating on the non-licensed spectrum,
wherein the fraction of the public land mobile network identity information corresponds to one of the public land mobile network's broadcast on the licensed spectrum in a system information block from where a complete public land mobile network supported in the non-licensed band is derived,
wherein only cells belonging to the list of public land mobile networks are assumed to be present by the user equipment,
wherein any cell on the non-licensed spectrum is accessible by the user equipment if there is a match between the list of public land mobile networks provided from the network element and a list of public land mobile networks according to the user equipment's access rules,
wherein the information is broadcasted in one or more system information blocks at a periodicity of 40 ms, and
wherein every other system information block broadcasted within the periodicity includes a partial amount of the public land mobile networks in the list.

11. The apparatus of claim 10, wherein the network element comprises at least one of an evolved node B, base station, or access point.

12. The apparatus of claim 10, wherein the information comprises at least one of information of whether the user equipment is allowed access to a cell and scheduling of system information, radio resource configuration information, cell-reselection and measurement reporting and measurement information common for intra-frequency and/or inter-radio access technology mobility, identity related information, information required to acquire multimedia broadcast multicast services, extended access class barring parameters, and information relevant for traffic steering between different radio networks.

13. The apparatus of claim 10, wherein the information is sent from a primary cell operating on the licensed spectrum.

14. The apparatus of claim 10, wherein the information includes a corresponding index on at least one cell operating on the licensed spectrum.

15. The apparatus of claim 10, wherein the information is broadcast in the carrier and/or cell operating on the non-licensed spectrum in a time divided manner.

16. An apparatus, comprising:
at least one processor; and
at least one memory including computer program code,
wherein the at least one memory and the computer program code are configured to, with the at least one processor, cause the apparatus at least to
receive, at a user equipment, information from a network element operating on a licensed spectrum; and
process the information, wherein the information is related to a carrier and/or cell operating on a non-licensed spectrum,
wherein the information includes a list of public land mobile networks operating on the non-licensed spectrum for network sharing,
wherein the list of a plurality of public land mobile networks also includes additional information indicating for which carrier and/or cell that each of the public land mobile networks in the list is valid,
wherein the information comprises identity information of each of the plurality of public land mobile networks,
wherein a fraction of the information is received from the carrier and/or cell operating on the non-licensed spectrum,
wherein the fraction of the public land mobile network identity information corresponds to one of the public land mobile network's broadcast on the licensed spectrum in a system information block from where a complete public land mobile network supported in the non-licensed band is derived, wherein the user equipment assumes that only cells belonging to the list of public land mobile networks are present, wherein any cell on the non-licensed spectrum is accessible by the user equipment if there is a match between the list of public land mobile networks received by the user equipment and a list of public land mobile networks according to the user equipment's access rules, wherein the information is received via a broadcast in one or more system information blocks at a periodicity of 40 ms, and wherein every other system information block received within the periodicity includes a partial amount of the public land mobile networks in the list.

17. The apparatus of claim 16, wherein the information comprises at least one of information of whether the user equipment is allowed access to a cell and scheduling of system information, radio resource configuration information, cell-reselection and measurement reporting and measurement information common for intra-frequency and/or inter-radio access technology mobility, identity related information, information required to acquire multimedia broadcast multicast services, extended access class barring parameters, and information relevant for traffic steering between different radio networks.

18. The apparatus of claim 16, wherein the information is received from a primary cell operating on the licensed spectrum.

19. The apparatus of claim 16, wherein the information includes identity information of a plurality of public land mobile networks and a corresponding index on at least one cell operating on the licensed spectrum.

* * * * *